Dec. 1, 1953  G. R. KEW  2,660,898
CONVEYER CHAIN
Filed May 27, 1950
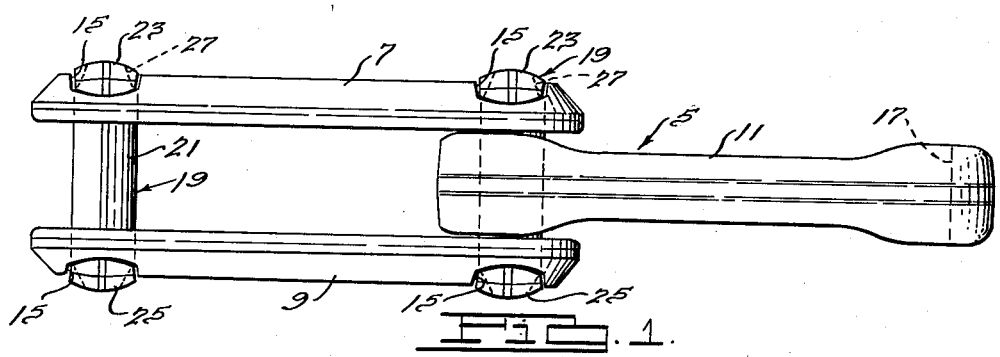
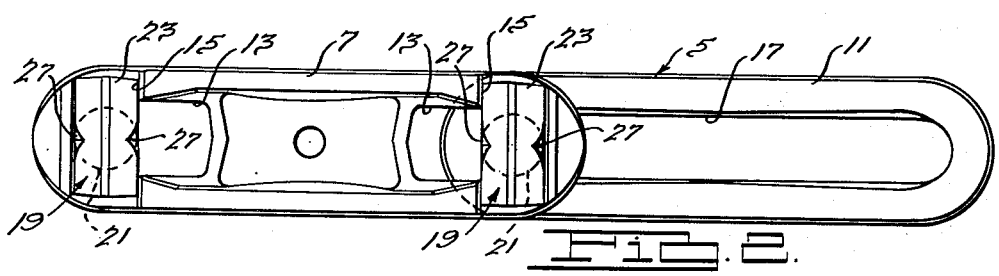
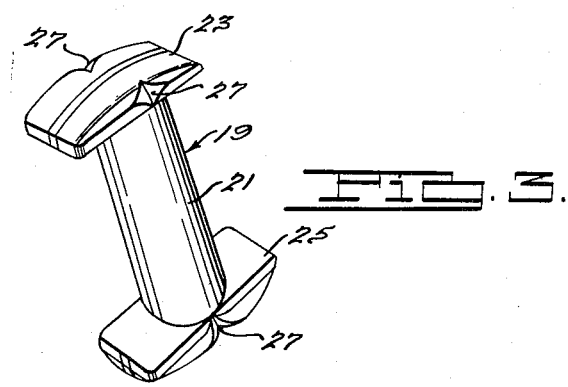
INVENTOR.
George R. Kew.
BY
Harness, Dickey & Pierce
ATTORNEYS.

Patented Dec. 1, 1953

2,660,898

UNITED STATES PATENT OFFICE 2,660,898

CONVEYER CHAIN

George R. Kew, Detroit, Mich., assignor to Palmer-Bee Company, Detroit, Mich., a corporation of Michigan Application May 27, 1950, Serial No. 164,660

3 Claims. (Cl. 74—257)

This invention relates generally to conveyor chains, and more particularly to a novel joint pin for pivotally connecting links of the chain.

Conveyor chains are used in many ways in manufacturing plants and the like, such as in overhead trolleys and also floor type conveyors. These conveyor chains generally comprise a plurality of pairs of vertically spaced links having single links interposed therebetween and pivotally connected therewith by vertically extending joint pins. The joint pins include shank portions extending through aligned openings in the links and head portions engaging the outer or upper and lower surfaces of the vertically spaced links so as to retain all of the links in an assembled relationship. These conveyors are frequently several thousand feet in length, with a joint pin every few inches, and it is necessary to lubricate the vertical surfaces or shank portions of the pins and the link surfaces contacted by the pin. If frequent lubrication of these surfaces is not effected, seizure, scoring and excessive friction occur, which result in excessive conveyor chain pull, causing damage to every part of the conveyor. This lubrication has been done by various means, but the construction of the chain and pin is such that oil or other lubricant must be dropped on the top head of the pin and work its way down onto the vertical surface or shank portion of the pin. In many instances this lubrication must be done by hand, and as the shank portion of the pin is confined by the links and is not exteriorly accessible, often a considerable amount of lubricant must be applied to the head portions in order to insure that at least some of the lubricant will flow onto the shank portion in order to properly lubricate the same. In this event a certain amount of the lubricant may drip from the conveyor onto the parts being carried thereby and/or onto the floor of the plant, thus often necessitating cleaning of the parts being conveyed and continual cleaning and wiping up of the plant floor.

It is therefore an object of this invention to overcome the aforementioned difficulties by providing grooves, notches or recesses, in the head portions of the joint pins, which communicate with the periphery of the shank portion and the exterior of the head in order to facilitate the leading or guiding of oil or other lubricant from the exterior surface of the head to the vertical surface or periphery of the pin shank portion, thus making it possible to lubricate the shank portion by the application of only a small amount of lubricant to the head, thus eliminating the application of an excessive amount of lubricant which might drip from the conveyor onto the parts or floor, while at the same time insuring proper lubrication of the shank portion and also permitting the shank portion to be lubricated by means of a mechanical lubricator, as distinguished from the hand lubricating operation which is so often necessary in present constructions.

It is a still further object of this invention to provide a joint pin of the aforementioned type in which both of the head portions, on opposite ends of the pin, are similarly notched or recessed so that the head portions are identical in construction and the pin cannot be improperly assembled with the links.

It is a still further object of this invention to provide a novel construction of the aforementioned type, which is relatively simple in construction, economical to manufacture, and which will permit the proper lubrication of joint pins in a simple and effective manner not heretofore possible.

These and other objects of this invention will become apparent from the following detailed description, taken in conjunction with the accompanying drawing, in which:

Figure 1 is a side elevational view of a portion of a conveyor chain showing the links thereof pivotally connected by the joint pin of this invention;

Fig. 2 is a top elevational view of the structure illustrated in Fig. 1, and

Fig. 3 is a perspective view of a joint pin of this invention.

Referring now to the drawing, it will be seen that a portion of a conveyor chain 5 is illustrated which includes a pair of vertical spaced links 7 and 9. A single link 11 has one end thereof disposed between one end of the links 7 and 9, while the opposite end thereof is adapted to be disposed between one end of another pair of vertically spaced links. It will be understood that a plurality of these links are provided and interconnected, as will be hereinafter described, to provide a complete conveyor chain. The links 7 and 9 are provided with vertically extending longitudinally elongated openings 13 adjacent each end thereof, and the outer face of each link adjacent the opening is provided with a transversely elongated recess 15, for reasons which will hereinafter appear. The link 11 is provided with a vertically extending longitudinally elongated opening 17, which extends from a point adjacent one end of the link to a point adjacent the other end thereof, for a reason which will hereinafter appear. The opening 17 is adapted to vertically register with the vertically aligned openings 13 in the links 7 and 9.

One end of the pair of links 7 and 9 is pivotally connected with one end of the link 11 by means of a vertically extending joint pin 19, which includes a cylindrical shank portion 21, and elongated head portions 23 and 25 on the opposite ends of the shank portion. Preferably the pin 19 is a one piece forged member. The joint pin 19 is assembled with the links 7, 9 and 11 by, for example, inserting the elongated head 23 upwardly through the elongated opening 13 in the link 9, through the elongated opening 17 in the link 11, and through the elongated opening 13 in the link 7. By then rotating the joint pin 19 ninety degrees the head portions 23 and 25 will rest in the recesses 15 of the links 7 and 9, respectively, to retain all of the links in an assembled relationship, while permitting the link 11 to pivot about the vertical axis of the pin. In order to permit the link 11 to freely pivot at all times, the shank portion 21 of the joint pin 19 must be lubricated to prevent seizure, scoring or excessive friction between it and the engaging surface or wall of the link opening 17.

In order to facilitate the proper lubrication of the vertical surface or shank portion 21 of the pin, V-shaped notches, grooves or recesses 27 are forged or otherwise formed in the opposite sides of the heads 23 and 25 so as to communicate the shank portion 21 with the exterior surface of the head portions 23 and 25. It should be noted that the pin head portions 23 and 25 are identical in construction and are both provided with notches 27 on each side thereof so that the pin cannot be improperly assembled with the links.

Thus, when the conveyor chain is operating a small amount of lubricant, such as a single drop, can be applied to the head 23 adjacent to or in the groove or notch 27, and the lubricant, such as oil, will flow downwardly onto the vertical surface or shank portion 19 of the joint pin to properly lubricate the same at all times, and it is not necessary to apply an excessive amount of the lubricant or oil to the head 23 in order to make sure that the shank portion will be properly lubricated, as in previous constructions. The lubricant grooves 27, therefore, will lead or guide the oil to the proper place on the pin to lubricate the shank portion and adjacent link surface in a simple, positive and efficient manner. It will also be appreciated that with this construction mechanical lubricators may be provided for lubricating the shank portion and the necessity of hand lubrication of the pins will be eliminated, thus reducing maintenance expense.

The joint pin of this invention therefore eliminates problems which have been perplexing the conveyor chain industry for years and permits simple, positive and efficient lubrication of the joint pin vertical surface so as to increase the life and efficiency of the conveyor chain without any of the disadvantages which were heretofore present.

What is claimed is:

1. A joint pin for pivotally connecting one end of a pair of vertically spaced links with one end of a link disposed therebetween in a conveyor chain, including a shank adapted to extend through openings in said links, an elongated transversely extending head on each end of said shank and adapted to engage the pair of links to retain all of said links in an assembled relationship, at least one of said heads having a notch therein forming a lubricant channel connecting the periphery of the shank with the exterior of the head so that lubricant applied to the exterior of the head will flow through the notch onto the shank.

2. A joint pin for pivotally connecting one end of a pair of vertically spaced links with one end of a link disposed therebetween in a conveyor chain, said joint pin including a shank portion adapted to extend through openings in said links, an elongated transversely extending head portion at each end of said shank portions and adapted to engage said pair of links to retain all of said links in an assembled relationship, both of said head portions being substantially identical in construction and having notches on opposite sides thereof extending from the exterior of the head to the adjacent end of the shank portion so as to form a lubricant channel connecting the periphery of the shank portion with the exterior of each head portion, whereby lubricant applied to the head portion will flow through the notch onto the shank portion.

3. A conveyor chain including a plurality of pairs of vertically spaced links, a link disposed between each pair of links and having the opposite ends thereof disposed between the vertical links of adjacent pairs, a joint pin pivotally connecting one end of each pair of vertically spaced links with one end of the link disposed therebetween, said vertically spaced links and said link disposed therebetween having vertically extending openings therein, said joint pin including a shank portion extending through said link openings, an elongated transversely extending head portion on each end of said joint pin shank portion engaging said vertically spaced links so as to retain all of said links in an assembled relationship and to hold said joint pin against rotation relative to said spaced links, at least one of said joint pin head portions having a notch therein connecting the periphery of the joint pin shank portion with the exterior of said head portion, so that lubricant applied to the head portion will flow through the notch onto the shank portion.

GEORGE R. KEW.

References Cited in the file of this patent

UNITED STATES PATENTS

| Number | Name | Date |
|---|---|---|
| 1,557,172 | Klein et al. | Oct. 13, 1925 |
| 2,487,500 | Webb | Nov. 8, 1949 |

FOREIGN PATENTS

| Number | Country | Date |
|---|---|---|
| 552,235 | Great Britain | Mar. 29, 1943 |